US011969785B2

(12) United States Patent
Vukovic et al.

(10) Patent No.: US 11,969,785 B2
(45) Date of Patent: Apr. 30, 2024

(54) SLIDING CLOSURE FOR A METALLURGICAL VESSEL

(71) Applicant: Refractory Intellectual Property GmbH & Co. KG, Vienna (AT)

(72) Inventors: Goran Vukovic, Vienna (AT); Rene Christen, Greppen (CH); Kurt Ackermann, Ballwil (CH)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 126 days.

(21) Appl. No.: 17/758,266

(22) PCT Filed: Dec. 11, 2020

(86) PCT No.: PCT/EP2020/085749
§ 371 (c)(1),
(2) Date: Jul. 1, 2022

(87) PCT Pub. No.: WO2021/144088
PCT Pub. Date: Jul. 22, 2021

(65) Prior Publication Data

US 2023/0042291 A1 Feb. 9, 2023

(30) Foreign Application Priority Data

Jan. 15, 2020 (EP) .................................... 20151906

(51) Int. Cl.

| | |
|---|---|
| ***B22D 41/24*** | (2006.01) |
| ***C21C 5/46*** | (2006.01) |
| ***F27D 3/15*** | (2006.01) |

(52) U.S. Cl.
CPC ............ *B22D 41/24* (2013.01); *C21C 5/4653* (2013.01); *F27D 3/1536* (2013.01)

(58) Field of Classification Search
CPC ......... B22D 41/22; B22D 41/24; B22D 41/38
See application file for complete search history.

(56) References Cited

U.S. PATENT DOCUMENTS

| | | | |
|---|---|---|---|
| 4,096,976 | A | 6/1978 | Daussan |
| 5,111,980 | A | 5/1992 | Amsler |
| 5,961,873 | A | 10/1999 | Keller |
| 7,530,479 | B2 | 5/2009 | Buhlmann et al. |

(Continued)

FOREIGN PATENT DOCUMENTS

| | | | | |
|---|---|---|---|---|
| AT | 514848 B1 * | 6/2016 | ............. | B22D 41/14 |
| EP | 3587002 A1 * | 1/2020 | ............. | B22D 41/24 |

(Continued)

*Primary Examiner* — Kevin E Yoon
(74) *Attorney, Agent, or Firm* — Brian Roffe

(57) ABSTRACT

The invention relates to a sliding closure (10) for a metallurgical vessel comprising a tapping hole (1) for draining metal melt or slag, said sliding closure being provided with a slider housing (3) that can be secured to the vessel (2) and a closure plate (6) that can move therein for opening and closing the tapping hole (1). The sliding closure (10) also has only this moveable closure plate (6), without a stationary closure plate, which is can be moved directly on a sliding surface (7), extending around the tapping hole, preferably of a casing block (9) in the vessel (2) and can be pressed by pretensioning elements. In this way, this sliding closure (10) provides a constructionally simpler structure and user-friendly handling.

9 Claims, 2 Drawing Sheets

(56) References Cited

U.S. PATENT DOCUMENTS

| | | | |
|---|---|---|---|
| 8,371,484 | B2 | 2/2013 | Keller et al. |
| 8,771,587 | B2 | 7/2014 | Amsler et al. |
| 8,939,331 | B2 | 1/2015 | Ackermann et al. |
| 9,200,846 | B2 | 12/2015 | Luettenberg |
| 10,799,949 | B2 | 10/2020 | Vukovic et al. |
| 11,141,779 | B2 | 10/2021 | Manhart et al. |

FOREIGN PATENT DOCUMENTS

| | | | | | |
|---|---|---|---|---|---|
| KR | 20170064828 | A | * | 6/2017 | ............. B22D 41/24 |
| WO | 20210144088 | A1 | | 7/2021 | |

* cited by examiner

SLIDING CLOSURE FOR A METALLURGICAL VESSEL

FIELD OF THE INVENTION

The invention relates to a sliding closure for a metallurgical vessel comprising a tapping hole for draining metal melt or slag, with a slider housing that can be secured to the vessel, and a closure plate that can move therein for opening and closing the tapping hole.

BACKGROUND OF THE INVENTION

With a generic sliding closure in accordance with the printed specification EP 2 318 559, provision is made, on a copper anode furnace for purifying copper melts, for a closure plate which is fixed in location and is capable of sliding. The tapping spout is aligned laterally in the vessel wall of the furnace in such a way that the copper casting takes place with the furnace in a tilted position, close to horizontal. Accordingly, the sliding closure is aligned approximately perpendicular to the mid-axis of the furnace. This furnace, configured as a drum, comprises a cylindrical steel jacket, as well as refractory cladding, wherein a refractory perforated brick and a refractory sleeve connected to it are embedded in the casting or draining region, which in each case form an outlet opening. Connected to this is the fixed-location refractory closure plate and the sliding refractory closure plate, wherein, by the sliding displacement of the sliding plate, the outlet from the furnace drum can be choked or closed.

OBJECTS AND SUMMARY OF THE INVENTION

The invention is based on the object of providing a sliding closure of the type referred to in the preamble which, with a structurally simple design and a high degree of reliability, allows for simple operation and maintenance.

This object is solved according to the invention in that the sliding closure comprises solely this sliding closure plate in the slider housing, without a fixed-location closure plate.

Such a sliding closure offers a number of advantages in relation to a conventional arrangement with two or more closure plates. On the one hand, it consists of fewer components, and is therefore more economical to manufacture, since the casing block, the closure plate, and also the casting sleeve, can be made of an economical metallic material, such as copper or steel.

On the other hand, the sliding closure is less prone to faults, and also only requires simpler maintenance. This arrangement also makes unnecessary the operation which is otherwise required of manually plugging the tapping hole in order to close it.

The sliding closure according to the invention can be easily adapted to any tapping hole. It is self-explanatory that these advantages are not restricted to the use of the sliding closure for draining of slag.

The invention further makes provision for the closure plate of the sliding closure to be pressed against the sliding surface of the furnace by the tensioning elements arranged in the slider housing, which, during the closing of the closure plate, are relieved of tension outside their area of effect, and there allow for the closure plate to pivot out of the closure housing in the non-loaded state. In this way, the closure plate can be easily inspected and replaced if necessary, without any elaborate manipulations being necessary.

In order to put the plate replacement into effect with the simplest possible structural arrangement, the invention makes provision for the closure plate to be mounted in a sliding trolley, with rollers preferably mounted in pairs, which run along on guides of a carrier frame of the slider housing, subjected to loading by the tensioning elements, wherein the guides are formed, outside the effective working area of the closure plate, as ramps, of which the inclination angle is dimensioned in such a way that the guides are lowered there by the amount in height which is relaxed by the tensioning elements. In this way it is possible for the tensioning by the tensioning elements to be relieved by the further movement of the sliding trolley.

In order to simplify the monitoring and replacement of the closure plate, the invention further makes provision for the front pair of rollers of the sliding trolley to be capable of rotating at the end of the ramps, in cut-out openings of pivot parts in the carrier frame, while the rear pair of rollers can be pivoted out through an intermediate space left free between the guides.

In order to lengthen the service life of the closure plate, it is to the purpose if it is provided in the area of the more intense wear stress with a replaceable insert element of metal, graphite, or refractory material.

The invention further makes provision for a projecting casting or draining sleeve to be connected to the closure plate, which is preferably aligned either perpendicular to the sliding movement of the closure plate or at an angle of, for example, 30° to the perpendicular of this sliding direction.

This casting or draining sleeve can serve as a guide for a drill or lance for the opening or burning out of the tapping hole, before or after the draining of the slags. It also contributes, in particular at the beginning of the tapping, to prevent the spilling of the slags. In addition, with an appropriate shape, this allows for the slag flow to be specifically guided in the direction of a channel.

It is particularly advantageous if the sliding surface of the furnace is formed by a casing block made of copper or refractory material. Such a block can, however, also be easily integrated in the tapping hole region of the furnace cladding, with or without cooling, such as with water, air, nitrogen, ionic fluids, or the like.

BRIEF DESCRIPTION OF THE DRAWINGS

The invention is explained in greater detail hereinafter on the basis of exemplary embodiments and by making reference to the drawings. These show.

DETAILED DESCRIPTION OF THE INVENTION

Figure 1:
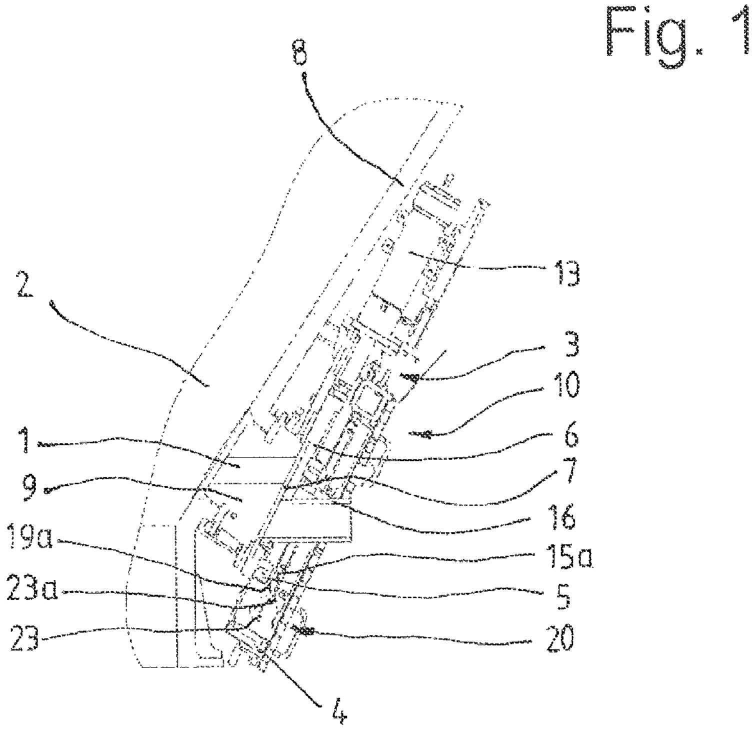
FIG. 1 A longitudinal section of a sliding closure according to the invention, in the closed position.
Figure 2:
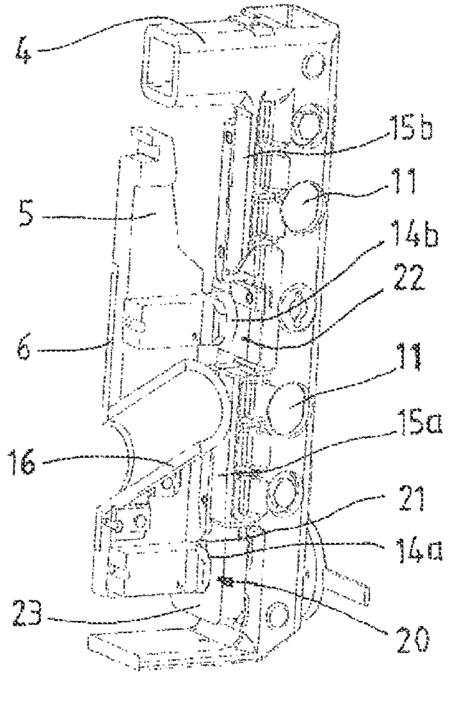
FIG. 2 a perspective longitudinal section of the sliding closure according to FIG. 1.
Figure 3:
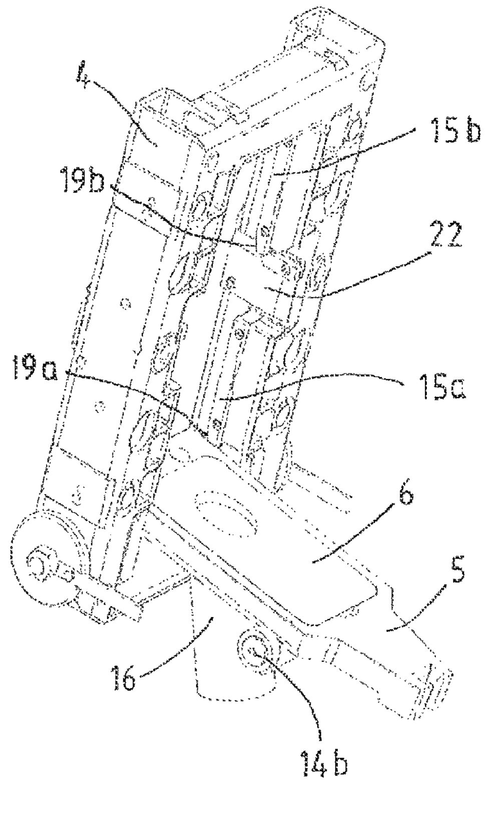
FIG. 3 a perspective view of the sliding closure according to FIG. 1, with the sliding trolley pivoted outwards.

The sliding closure 10 shown in FIG. 1 to FIG. 3 serves to drain slags through a tapping hole 1 of a metallurgical vessel 2, partially represented, which is provided with a spout for draining a metal melt. Such a metallurgic vessel is particularly well-suited for the casting or draining of non-ferrous metals, such as copper or ferroalloys, but it can also be used with converters, electric furnaces, or the like, with which steel melts and slags are cast or drained.

The sliding closure 10 consists essentially of a slider housing 3, which can be secured to the vessel 2, with a carrying frame 4 and a sliding trolley 5 for the replaceable receiving of a closure plate 6. The latter closure plate is movable in the carrier frame 4 by means of a hydraulic cylinder 13, which can be coupled to it, the stroke length of which is specified during the casting or draining between an open position and a closed position. The carrier frame 4 is provided in this situation with a hollow profile cross-section of its four sides.

Connected to the closure plate 6 is a projecting casting or draining sleeve 16, which, together with the tapping hole 1, runs at an angle of 30° to the perpendicular of the sliding direction of the closure plate 6. In the upright position of the furnace 2, its upper side wall, at which the sliding closure 10 is mounted, with its base plate 8, is likewise formed at an angle of 30° to the outside. Accordingly, the tapping hole 1 is aligned in such a way that it runs approximately horizontally in this upright furnace position.

According to the invention, the sliding closure 10 comprises solely this movable closure plate 6, without one or more other fixed-location closure plates. This closure plate 6 can be moved, pressed directly on a sliding surface 7 of a casing block 9, in the vessel 2, extending around the tapping hole 1, wherein this casing block 9 consists of copper and/or a refractory material. In principle, it could also be made as multilayered, or multi-part, or the like. The closure plate 6 can be provided in the region of the passage hole with a replaceable insert element made of metal, graphite, or refractory material.

As a result, a decisive advantage of the invention is derived, namely that the casing block 9, the closure plate 6, and/or the draining or casting sleeve 16, can be made of an economical metal material, such as steel, copper, or similar. With this simple formation of this separate draining or casting arrangement, these elements can be very easily built into a furnace wall, and operated with low maintenance.

The sliding trolley 5 comprises two rollers 14*a*, 14*b*, arranged laterally in pairs, as slide elements, which run along on guides 15*a*, 15*b* of the carrier frame 4, which can be tensioned by tensioning elements 11 at the slider housing 3, and therefore the pressing force of the tensioning elements 11 onto the slider trolley 5 and onto the closure plate 6 is transferred uniformly. It is of course possible for the slide elements to be configured as slide shoes or, conversely, for the guides to be formed in the slide trolley and the slide elements to formed in the frame 4. These guides 15*a*, 15*b* are formed at their ends as ramps 19*a*, 19*b*, the inclination angles of which are dimensioned in such a way that they are lowered there by a height amount which relieves the stress on the spring bolts 10. When the rollers 14*a*, 14*b* of the slider trolley 5 slide along on the guides 15*a*, 15*b* and then on these ramps 19*a*, 19*b*, the tensioning force is dissipated.

By means of a pivot device 20, the slider trolley 5, with the closure plate 6, after the sliding movement, outside the effective working range, out of the carrier frame 4, can be pivoted out of or into the frame. This pivot device 20 is composed of pivot parts 23, which can be tilted out of both sides in the carrier frame 4, and which correspond to the front roller pair 14*a*. These two pivot parts 23 can in each case be rotated into two positions.

In the one position according to FIG. 1, these pivot parts 23 of the pivot device 20 each form, on the one hand, a raising limit stop 23*a* on the end side at one of the guides 15*a*, such that the slide trolley 5 cannot be released from the tensioning force when in the operational state.

On the other hand, according to FIG. 2, cut-out openings 21 leading away from the furnace 2, in the pivot parts 23, make it possible for the rollers 14*a* to be introduced into such an opening 21, as represented, and, in consequence, by a rotation of the pivot parts 23, the rollers 14*a*, and therefore the slide trolley 5, can be brought onto the guides 15*a* and put under tension. Likewise, the other roller pair 14*b* of the slide trolley can be pushed in through a corresponding intermediate space 22 between the guides 15*a*, 15*b*, and then pushed onto the guides 15*b*.

When the slide trolley 5 is taken out or pivoted out, the pivot parts 23 of the pivot device 20 are rotated, vice-versa, from the position with the raising delimitation, and the rollers 14*a* can be introduced into these cut-out openings 21 by a corresponding adjustment of the slide trolley 5, by means of the hydraulic cylinder 13, and the slide trolley can then be pivoted out, as is shown in FIG. 3. If it is intended that the slide trolley 5 should be taken away from the carrier frame 4, these pivot parts 23 can be rotated downwards, as is shown in FIG. 2. As a result, the monitoring or replacement of the closure plate 6 can be effected in a very user-friendly manner.

Figure 4:
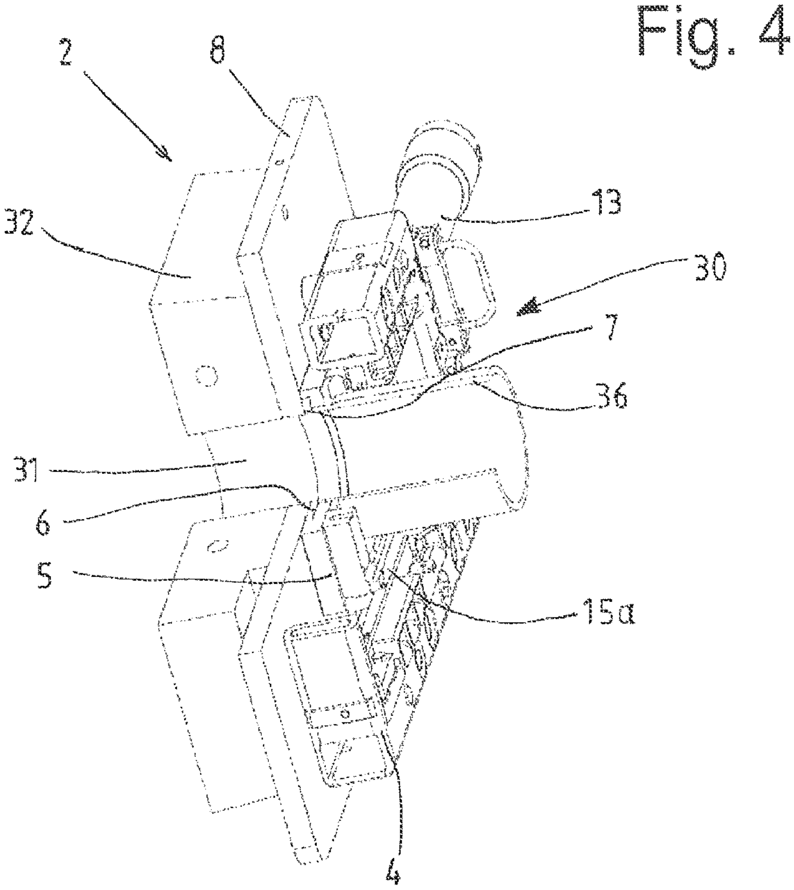
FIG. 4 a perspective longitudinal section of a variant of a sliding closure.

The sliding closure 30 according to FIG. 4 is essentially configured the same as for those according to FIG. 1 to FIG. 3, and consequently only the differences are referred to hereinafter. The same reference numbers are used as for the sliding closure 10 described in accordance with FIG. 1.

The main difference with this sliding closure 30 consists of the fact that the tapping hole 31, and with it the casting or draining sleeve 36, are aligned with their axes perpendicular to the displacement direction of the closure plate 6. As a result, a somewhat simpler structural design is derived with this sliding closure than that according to FIG. 1. With the vessel 2, shown in part, the casing block 32 is indicated on the inner side of its wall, which extends as far as the slide surface 7, which is in contact with the closure plate 6. Accordingly, in turn, a simple configuration can be achieved with the tight sealed connection of the vessel to the closure plate 6.

The sliding closure according to the invention has the advantage in relation to a conventional fixed-location and a movable closure plate that it contains fewer component parts, and is therefore very user-friendly.

The embodiment described relates to a sliding closure which is used for draining slag. The sliding closure according to the invention can also be used, however, without further ado, for the casting of metal melts.

The invention has been adequately described by the exemplary embodiments heretofore. It can also be explained by other variants. In principle, instead of these rollers on the slide trolley, conventional guide rails can also be used, and the carrier frame 4 can also be released from the casting housing, or secured to it, by other securing means.

The casing block, the closure plate, and/or also the casting sleeve, could in principle also be made from a refractory material. The casing block could also be fitted with an insert on its sliding surface which is in contact with the closure plate.

The invention claimed is:

1. Sliding closure for a metallurgical vessel with a tapping hole for casting metal melts or slags, comprising:

a slider housing configured to be fastened to the vessel; and a movable closure plate configured to move, in the slider housing for opening and closing the tapping hole, the sliding closure comprising exclusively the movable closure plate without a fixed-location closure plate, wherein the movable closure plate is pressed directly onto a sliding surface extending around the tapping hole of a casing block in the vessel and is pressed thereby by tensioning elements.

2. Sliding closure according to claim 1, further comprising a slide trolley movably guided in a carrier frame of the slider housing with the movable closure plate, which, on movement outside an effective working area of the movable closure plate, is released from tensioning, and pivoted out of and into the carrier frame by means of a pivot device.

3. Sliding closure according to claim 2, further comprising slide elements arranged laterally in the slide trolley and that run along on guides of the carrier frame of the slider housing, put under loading by the tensioning elements, wherein the guides are formed, outside the effective working area of the movable closure plate as ramps, an inclination angle of the ramps being dimensioned such that the guides are lowered there by an amount in height which is relaxed by the tensioning elements.

4. Sliding closure according to claim 3, wherein one roller pair of the slide trolley, formed as slide elements, is received at an end of the ramp in each case in a corresponding cut-out opening of a pivot part of the pivot device in the carrier frame, while another roller pair, formed as slide elements, is pivoted outwards through an intermediate space remaining free between the guides.

5. Sliding closure according to claim 4, wherein the pivot parts of the pivot device are rotatable into two positions, wherein, in one position, the pivot parts each form a raising delimitation stop on an end side at one set of guides in order that the slide trolley cannot be released from a tensioning force when in an operational state, while, in the other position, the roller pair of the slide trolley, formed as slide elements, is receivable in the cut-out openings for pivoting of the slide trolley outwards and inwards respectively.

6. Sliding closure according to claim 1, wherein the sliding plate is provided with a replaceable insert made of metal, graphite, or refractory material.

7. Sliding closure according to claim 1, wherein the sliding surface for the movable closure plate is formed by a casing block, integrated in a housing cladding and formed from copper or refractory material.

8. Sliding closure according to claim 1, wherein the tapping hole, the slide plate, and a projecting casting or draining sleeve are aligned in relation to a sliding device of the movable closure plate as perpendicular or at an angle of 60°.

9. Sliding closure according to claim 1, wherein the tensioning elements are formed in each case by two carrier frames arranged symmetrically and on a parallel axis at the slider housing and are associated with it, which have an effect of tensioning each carrier frame against the slide trolley.

* * * * *